United States Patent
Klews et al.

(10) Patent No.: US 9,381,914 B2
(45) Date of Patent: Jul. 5, 2016

(54) METHOD FOR STABILIZING A TWO WHEELED VEHICLE

(71) Applicant: Robert Bosch GmbH, Stuttgart (DE)

(72) Inventors: Matthias Klews, Tuebingen (DE); Markus Lemejda, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/650,503

(22) PCT Filed: Oct. 14, 2013

(86) PCT No.: PCT/EP2013/071415
§ 371 (c)(1),
(2) Date: Jun. 8, 2015

(87) PCT Pub. No.: WO2014/090439
PCT Pub. Date: Jun. 19, 2014

(65) Prior Publication Data
US 2015/0314781 A1    Nov. 5, 2015

(30) Foreign Application Priority Data
Dec. 12, 2012 (DE) .......... 10 2012 222 884

(51) Int. Cl.
*B60W 30/02*     (2012.01)
*G05D 1/08*      (2006.01)
(Continued)

(52) U.S. Cl.
CPC .......... *B60W 30/02* (2013.01); *B60T 8/261* (2013.01); *B60W 10/04* (2013.01); *B60W 10/06* (2013.01); *B60W 10/18* (2013.01); *B60W 10/184* (2013.01); *B62J 27/00* (2013.01); *B62K 11/00* (2013.01); *G05D 1/0891* (2013.01); *B60T 2230/02* (2013.01); *B60W 2300/36* (2013.01); *B60W 2520/105* (2013.01); *B60W 2520/125* (2013.01);
(Continued)

(58) Field of Classification Search
CPC ..... B60W 30/02; B60W 10/04; B60W 10/06; B60W 10/18; B60W 10/184; B60W 2520/14; B60W 2520/20; B60W 2520/26; B60W 2520/28; B60W 2520/105; B60W 2520/125; B60W 2720/14; B60W 2720/16; B60W 2720/18; B60W 2300/02; B60W 2300/36; G05D 1/0891; B60T 8/261; B62K 11/00; B62K 2207/02; B62J 27/00; B62M 7/02; B60Y 2200/12
USPC .......................................................... 701/71
See application file for complete search history.

(56) References Cited

U.S. PATENT DOCUMENTS 5,207,483 A * 5/1993 Shimada ............... B60T 8/1755
                                              188/181 A
5,259,577 A * 11/1993 Achkar .................... B64G 1/24
                                                   244/164
(Continued)

FOREIGN PATENT DOCUMENTS

DE          102 47 991        4/2004
DE      10 2008 011577        9/2008
(Continued)

*Primary Examiner* — McDieunel Marc
*Assistant Examiner* — James E Stroud
(74) *Attorney, Agent, or Firm* — Norton Rose Fulbright US LLP

(57) ABSTRACT

In a method for stabilizing a two-wheeled vehicle, the current attitude angle is compared to an associated boundary value which is determined as a function of at least one current driving state variable.

9 Claims, 1 Drawing Sheet

(51) Int. Cl.
*B60W 10/04* (2006.01)
*B60W 10/184* (2012.01)
*B60W 10/06* (2006.01)
*B60W 10/18* (2012.01)
*B62J 27/00* (2006.01)
*B62K 11/00* (2006.01)
*B60T 8/26* (2006.01)
*B62M 7/02* (2006.01)

(52) U.S. Cl.
CPC ........ *B60W 2520/14* (2013.01); *B60W 2520/20* (2013.01); *B60W 2520/26* (2013.01); *B60W 2520/28* (2013.01); *B60W 2720/14* (2013.01); *B60W 2720/16* (2013.01); *B60W 2720/18* (2013.01); *B60Y 2200/12* (2013.01); *B62K 2207/02* (2013.01); *B62M 7/02* (2013.01)

(56) References Cited

U.S. PATENT DOCUMENTS

| | | | | |
|---|---|---|---|---|
| 5,452,869 | A * | 9/1995 | Basuthakur | B64G 1/24 244/164 |
| 6,494,281 | B1 * | 12/2002 | Faye | B60K 31/00 180/197 |
| 7,058,492 | B1 * | 6/2006 | Yasui | B60R 16/0233 701/38 |
| 8,016,060 | B2 * | 9/2011 | Miki | B60L 15/20 180/282 |

FOREIGN PATENT DOCUMENTS

| | | |
|---|---|---|
| DE | 10 2010 003951 | 10/2011 |
| EP | 2 233 388 | 9/2010 |

* cited by examiner

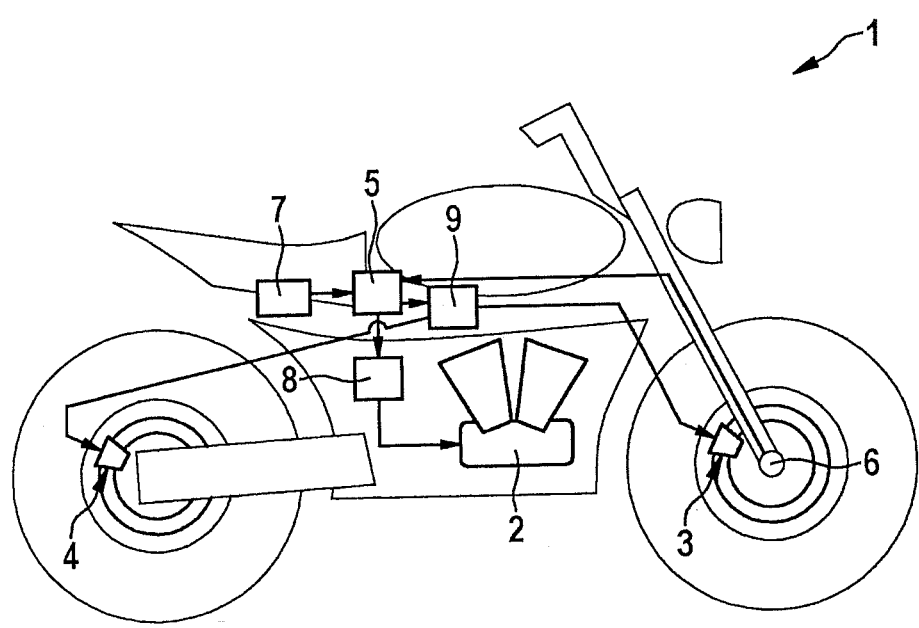

METHOD FOR STABILIZING A TWO WHEELED VEHICLE

FIELD OF THE INVENTION

The present invention relates to a method for stabilizing a two-wheeled vehicle.

BACKGROUND INFORMATION

In order to be able to ride a motorcycle through a curve, in a stable manner, the speed, the sloping position and the steering angle have to be adapted to the current curve radius as well as the road and weather conditions, otherwise there is the danger that the motorcycle oversteers, and the rear wheel skids away laterally in the curve. If the motorcycle in this situation then gets onto a roadway section having a higher coefficient of friction, there is the danger of a rollover in the direction of the outside of the curve, which goes hand-in-hand with the danger of a considerable injury.

German document DE 10 2010 003 951 A1 proposes, as a stabilization measure, carrying out a driving dynamics regulation in a motorcycle when the attitude angle or the attitude angle change exceeds a specified threshold value. The attitude angle is determined based on sensor data on the longitudinal speed, the transverse acceleration, the rolling rate and the yaw rate as well as the rolling and pitching angles, if necessary. If the attitude angle exceeds the assigned threshold value, stabilizing measures are taken, particularly lowering the vehicle speed by reducing the engine torque and increasing the brake pressure.

SUMMARY OF THE INVENTION

The present invention is based on the object of improving the travel safety with two-wheeled vehicles.

According to the present invention, this object is attained by the features described herein. The further descriptions herein indicate expedient refinements.

Using the method of the present invention, a two-wheeled vehicle may be stabilized, particularly a motorcycle or another type of motor-driven two-wheeled vehicle which is in a critical driving situation. The method for stabilizing may be used during cornering of the two-wheeled vehicle. Critical driving stets may occur if the current driving speed, the steering angle and/or the sloping position of the two-wheeled vehicle are not adapted to the radius of the curve and the road conditions and weather conditions. At excessive curve speed, too great a change in speed caused by an acceleration or braking in a sloping position and at changes in the coefficient of friction between the tires and the road, unstable driving situations may occur at which the two-wheeled vehicle greatly oversteers and the rear wheel skids in the direction of the outside of the curve.

In order to counteract this situation in time, in the method according to the present invention, using a sensor system in the two-wheeled vehicle, a driving condition, that is threatening or has already occurred, is detected and stabilizing countermeasures are taken in that case. Based on sensor data, the attitude angle or a driving state that correlates with the attitude angle is ascertained and compared to an associated boundary value. If the attitude angle or the driving state variable correlating with it exceeds the boundary value, then, as a countermeasure, the torque at at least one vehicle wheel is automatically modified. This relates to an automatic braking intervention on the front wheel and/or at the rear wheel, using an increase or perhaps a decrease in the braking torque, as well as an intervention in the engine drive torque, which acts on the rear wheel. As a rule, the engine drive torque is reduced, in order, in addition to the braking intervention, to achieve a speed reduction. Under certain circumstances, however, it may also be expedient to increase the engine drive torque so as to stabilize the two-wheeled vehicle. The intervention in the engine drive torque takes place in the same manner as the automatic braking intervention, so that basically no stabilizing behavior measure on the part of the driver is required.

The automatic intervention is superimposed on the driver-side intervention, so that a resulting value is set which contributes to the stabilization of the two-wheeled vehicle. In this connection, it may perhaps also be indicated that one should reduce too great a braking intervention by the driver by an automatic intervention in the braking system of the vehicle. The intervention takes place alternatively or cumulatively in the front wheel brake, the rear wheel brake and or the drive engine.

The current attitude angle is advantageously determined in the two-wheeled vehicle and compared to an assigned boundary value. Basically, it is also possible, however, instead of the attitude angle, to ascertain as the control variable a driving state variable correlated to it and compare this to an associated boundary value, especially the tire slip angle, the correlating driving state variable being measured either directly by a sensor or determined from measured values, in corresponding fashion to the attitude angle.

In the method according to the present invention, the boundary value is determined as a function of at least one further, current vehicle state variable. Consequently, the boundary value is not a fixed, constant value, but is rather established as a function of the driving situation. This has the advantage that, based on the better adaptation to the current driving state, a precise, sensitive regulation is possible, and with that, a better stabilization of the two-wheeled vehicle. As the vehicle state variable, which goes into the determination of the boundary value, the current two-wheeled vehicle speed, for example, comes into consideration, which is available as a measured value. It is also possible, however, to take into account other vehicle state variables in the determination of the boundary value, as long as the vehicle state variables represent a driving dynamics value of the two-wheeled vehicle. For example, a transverse dynamic state variable, such as the vehicle's transverse acceleration or the yaw rate may be taken into account.

The boundary value depends at least on one vehicle state variable which is not identical to the control variable. There are possible embodiments in which two or more vehicle state variables, that are not identical to the control variable, are taken into account in the determination of the boundary value.

According to a further expedient embodiment, the boundary value is updated continuously as a function of the vehicle state variable. As soon as the control variable, that is, the attitude angle or a value correlated with is, has reached the vehicle state-dependent boundary value, the stabilizing regulation begins. As of this time, the boundary value may furthermore be updated continuously, in that the current vehicle state variable is measured or ascertained from measured values, and the boundary value is calculated as a function of this current value. This has the advantage that the boundary value, which represents the control threshold, is continuously updated or corrected, the control threshold being lowered with increasing stabilization.

However, as of the time of the beginning of the regulation, it is also possible to leave the boundary value constant, so that the boundary value remains constant for the duration of the stabilizing intervention.

The stabilizing intervention, that is, the regulation, takes place until the attitude angle or the value correlated to it has fallen below the associated boundary value. The boundary value to be undershot is either the same boundary value at whose exceeding the stabilizing intervention begins, or, according to an alternative embodiment, a deviating, particularly a lower boundary value, which is able to be determined analogously to the upper boundary value. According to one simple variant of the embodiment, the lower boundary value is determined as a function of the upper boundary value.

The current state variables are determined from a sensor system that the two-wheeled vehicle carries with it. The state variables which have to be measured directly are, for example, at least one wheel speed of the two-wheeled vehicle, the longitudinal and/or transverse acceleration, the yaw rate, rolling angle or rolling rate and/or the pitching angle of the two-wheeled vehicle.

The method runs in a regulating or control unit, which is carried on the two-wheeled vehicle. In the regulating or control unit, the measuring signals of the sensor system are evaluated and it is queried whether the attitude angle or the value correlated to it exceeds the associated, currently calculated boundary value. If this is the case, actuators in the two-wheeled vehicle are operated, using adjusting signals of the regulating or control unit for carrying out the stabilizing intervention in a controlled manner, in particular, the drive engine of the of the two-wheeled vehicle is operated and/or the front wheel brake and/or the rear wheel brake.

Additional advantages and expedient embodiments may be seen in the further claims, the description of the figures and the drawings, in which a motorcycle is shown schematically, having a regulating or control unit, a sensor system, a drive engine and wheel brakes.

BRIEF DESCRIPTION OF THE DRAWINGS

The FIGURE shows a motorcycle having a regulating or control unit, a sensor system, a drive engine and wheel brakes.

DETAILED DESCRIPTION

In the FIGURE, a motorcycle 1 is shown having a drive engine 2 executed as an internal combustion engine. In addition, front wheel brake 3 and rear wheel brake 4 are drawn in schematically. Motorcycle 1 is equipped with a regulating or control unit 5, and furthermore, a wheel rotational speed sensor 6 is situated on the front wheel which, the same as inertial sensor 7, is a component of the sensor system on the motorcycle. The vehicle's longitudinal acceleration and the transverse acceleration are able to be determined via inertial sensor system 7, and, in addition, also expediently the yaw rate and the rolling rate. Motorcycle 1 is furthermore equipped with an engine control unit 8, via which the engine drive torque may be set, and with and antilock (ABS) control unit 9 for actuating front wheel brake 3 and, if necessary, also rear wheel brake 4. Regulating or control unit 5 communicates with the sensor system as well as with engine control unit 8 and ABS control unit 9.

In order to prevent situations critical to riding, especially while cornering, the current attitude angle is ascertained continuously from sensor system 6, 7 and compared to an associated boundary value, in the case of the exceeding of the boundary value, a driving stabilizing regulation being carried out by interventions in drive engine 2 and/or wheel brakes 3, 4. The attitude angle is ascertained, in a manner known per se, from longitudinal and transverse dynamic variables, such as the vehicle speed, the yaw rate, the rolling rate, the sloping position angle or rather the rolling angle and the pitching angle. Alternatively to calculating the attitude angle, it is also possible to determine the tire slip angle on the rear wheel, and to compare it to an associated boundary value.

The boundary value is determined as a function of at least one current driving state variable, particularly the current two-wheeled vehicle speed. If the query yields that the attitude angle exceeds the speed-dependent boundary value, engine control unit 8 and/or ABS control unit 9 are influenced via the regulating and/or control unit, and in these control units, adjusting signals are generated for setting drive engine 2, front wheel brake 3 and/or rear wheel brake 4. The actuation of the engine and the wheel brakes takes place as a function of the difference between the current attitude angle and the associated boundary value. The greater the difference, the more the engine's throttle valve, for example, in the direction of the closing position and, if necessary, the more the brake pressure may be increased, in order to reduce the vehicle speed.

As soon as the attitude angle falls below the given boundary value again, the interventions in the drive engine and the wheel brakes may be terminated again. The boundary value which has to be undershot for the termination is advantageously identical to the boundary value at whose exceeding the stabilizing intervention begins. Basically, however, the boundary values may also some distance apart, the terminating boundary value being lower than the boundary value for beginning the interventions.

What is claimed is:

1. An automated method for stabilizing a two-wheeled vehicle, the method comprising:
   ascertaining, by a sensor system, a current attitude angle or a vehicle state variable correlating to the attitude angle; and
   automatically modifying, by a vehicle control unit including a processor, if the current attitude angle or the vehicle state variable correlating to the attitude angle exceeds an associated boundary value, the torque at at least one vehicle wheel, wherein the boundary value is determined by the vehicle control unit as a function of the current two-wheeled vehicle speed.

2. The method of claim 1, wherein when the boundary value is exceeded, the speed is reduced.

3. The method of claim 2, wherein the engine drive torque is reduced to reduce the speed.

4. The method of claim 2, wherein the front wheel is braked to reduce the speed.

5. The method of claim 1, wherein the boundary value is updated continuously as a function of the current vehicle state variable.

6. The method of claim 1, wherein the boundary value remains constant for the duration of the stabilizing intervention.

7. The method of claim 1, wherein the tire slip angle of the rear wheel, as the control variable, is determined and compared to an associated boundary value.

8. A regulating/control unit for stabilizing a two-wheeled vehicle, comprising:
   an ascertaining arrangement to ascertain a current attitude angle or a vehicle state variable correlating to the attitude angle; and
   a modifying arrangement to automatically modify, if the current attitude angle or the vehicle state variable correlating to the attitude angle exceeds an associated boundary value, the torque at at least one vehicle wheel, wherein the boundary value is determined as a function of the current two-wheeled vehicle speed.

9. A driver assistance system in a two-wheeled vehicle, comprising:
   a regulating/control unit for stabilizing a two-wheeled vehicle, including:
      an ascertaining arrangement to ascertain a current attitude angle or a vehicle state variable correlating to the attitude angle; and
      a modifying arrangement to automatically modify, if the current attitude angle or the vehicle state variable correlating to the attitude angle exceeds an associated boundary value, the torque at at least one vehicle wheel, wherein the boundary value is determined as a function of the current two-wheeled vehicle speed.

* * * * *